United States Patent
Hu

(10) Patent No.: US 7,544,915 B2
(45) Date of Patent: Jun. 9, 2009

(54) AIRCRAFT GALLEY CARTS AND ASSOCIATED METHODS OF MANUFACTURE

(75) Inventor: Ben P. Hu, Seattle, WA (US)

(73) Assignee: The Boeing Company, Chicago, IL (US)

( * ) Notice: Subject to any disclaimer, the term of this patent is extended or adjusted under 35 U.S.C. 154(b) by 654 days.

(21) Appl. No.: 10/813,765

(22) Filed: Mar. 31, 2004

(65) Prior Publication Data

US 2005/0218615 A1    Oct. 6, 2005

(51) Int. Cl.
B62B 11/00    (2006.01)
(52) U.S. Cl. ................. 219/387; 280/47.34; 280/79.11; 280/651; 280/79.3; 280/33.998; 280/79.2; 280/47.36
(58) Field of Classification Search .............. 280/47.35, 280/79.11, 47.34, 79.3, 33.992, 33.994, 651, 280/33.998, 79.2, 47.36; 219/387
See application file for complete search history.

(56) References Cited

U.S. PATENT DOCUMENTS

| | | | |
|---|---|---|---|
| 2,489,493 A | 11/1949 | Kuenzie | |
| 2,939,811 A | 6/1960 | Dillon | |
| 3,085,842 A | 4/1963 | Johnson | |
| 3,205,033 A * | 9/1965 | Stentz | 312/236 |
| 3,297,373 A | 1/1967 | Andrews et al. | |
| 3,542,444 A | 11/1970 | Webb et al. | |
| 3,698,588 A | 10/1972 | Pogorski | |
| 3,823,972 A * | 7/1974 | Ramer | 294/68.26 |
| 3,847,250 A | 11/1974 | Sherrill | |
| 3,847,458 A | 11/1974 | Nowak | |
| 3,850,714 A | 11/1974 | Adorjan | |
| 3,853,367 A | 12/1974 | Jamison et al. | |
| 3,864,170 A | 2/1975 | Krieger | |
| 3,877,744 A * | 4/1975 | Miller | 296/22 |
| 3,948,347 A | 4/1976 | Rutledge | |
| 4,047,351 A | 9/1977 | Derner et al. | |
| 4,155,611 A | 5/1979 | Brekke et al. | |
| 4,172,915 A | 10/1979 | Sheptak et al. | |
| 4,210,070 A | 7/1980 | Tatum et al. | |
| 4,214,418 A | 7/1980 | Smith | |
| 4,284,674 A | 8/1981 | Sheptak | |
| 4,340,630 A | 7/1982 | Doty | |
| 4,346,756 A * | 8/1982 | Dodd et al. | 165/48.1 |
| 4,433,517 A | 2/1984 | Moore, Jr. | |
| 4,444,821 A | 4/1984 | Young et al. | |

(Continued)

OTHER PUBLICATIONS

Driessen Aircraft Interior Systems, Full Size Inflight Service Cart, 2 pgs, The Netherlands.

(Continued)

Primary Examiner—Christopher P. Ellis
Assistant Examiner—Cynthia F. Collado
(74) Attorney, Agent, or Firm—Perkins Coie LLP

(57) ABSTRACT

Aircraft galley carts and methods for their manufacture are disclosed herein. In one embodiment, a galley cart for use on an aircraft includes a body configured to be moved along a passenger aisle of the aircraft. The body can include a one-piece plastic shell forming a first side portion and at least one of a second side portion, a top portion, and a bottom portion of the body. In one aspect of this embodiment, at least a portion of the one-piece plastic shell can include an inner skin offset from an outer skin in a double-wall configuration.

18 Claims, 7 Drawing Sheets

U.S. PATENT DOCUMENTS

| | | | |
|---|---|---|---|
| 4,579,756 A | 4/1986 | Edgel | |
| 4,696,954 A | 9/1987 | Pritchard et al. | |
| 4,730,748 A | 3/1988 | Bane | |
| 4,775,002 A * | 10/1988 | Iwamoto | 165/47 |
| 4,821,914 A | 4/1989 | Owen et al. | |
| 4,936,377 A * | 6/1990 | DeVogel et al. | 165/47 |
| 5,007,226 A | 4/1991 | Nelson | |
| 5,106,173 A | 4/1992 | Kelley et al. | |
| 5,115,602 A | 5/1992 | de Larrard | |
| 5,123,564 A | 6/1992 | Hobson | |
| 5,159,973 A | 11/1992 | Pennington et al. | |
| 5,194,482 A | 3/1993 | Chundury et al. | |
| 5,344,030 A | 9/1994 | Evenson | |
| 5,345,814 A | 9/1994 | Cur et al. | |
| 5,347,827 A | 9/1994 | Rudick et al. | |
| 5,368,380 A | 11/1994 | Mottmiller et al. | |
| 5,390,834 A * | 2/1995 | Bitter et al. | 222/608 |
| 5,392,960 A | 2/1995 | Kendt et al. | |
| 5,404,935 A * | 4/1995 | Liebermann | 165/48.1 |
| 5,407,074 A | 4/1995 | Brightbill et al. | |
| 5,433,518 A | 7/1995 | Skov | |
| 5,441,170 A | 8/1995 | Bane, III | |
| 5,454,427 A * | 10/1995 | Westbrooks et al. | 165/267 |
| 5,522,216 A | 6/1996 | Park et al. | |
| 5,605,344 A * | 2/1997 | Insalaco et al. | 280/47.34 |
| 5,628,241 A * | 5/1997 | Chavanaz et al. | 99/331 |
| 5,637,933 A | 6/1997 | Rawlings et al. | |
| 5,664,396 A | 9/1997 | Lyman et al. | |
| 5,688,031 A | 11/1997 | Tryon | |
| 5,936,318 A | 8/1999 | Weiler et al. | |
| 5,979,693 A | 11/1999 | Bane, III | |
| 6,034,355 A * | 3/2000 | Naderi et al. | 219/387 |
| 6,038,830 A | 3/2000 | Hirath et al. | |
| 6,109,057 A | 8/2000 | Shervington et al. | |
| 6,131,404 A | 10/2000 | Hase et al. | |
| 6,192,703 B1 | 2/2001 | Salyer et al. | |
| 6,260,377 B1 | 7/2001 | Tamaoki et al. | |
| 6,295,829 B1 * | 10/2001 | Gibot | 62/371 |
| 6,408,841 B1 | 6/2002 | Hirath et al. | |
| 6,415,623 B1 | 7/2002 | Jennings et al. | |
| 6,460,952 B1 | 10/2002 | Tryon | |
| 6,476,519 B1 | 11/2002 | Weiner | |
| 6,483,204 B2 | 11/2002 | Hanaki | |
| 6,550,259 B2 | 4/2003 | Cartwright et al. | |
| 6,664,656 B2 | 12/2003 | Bernier | |
| 6,672,601 B1 * | 1/2004 | Hofheins et al. | 280/47.34 |
| 6,695,325 B2 * | 2/2004 | Carrillo | 280/47.34 |
| 6,778,414 B2 | 8/2004 | Chang et al. | |
| 6,935,641 B2 * | 8/2005 | Hahn | 280/47.19 |
| 2003/0082357 A1 | 5/2003 | Gokay et al. | |
| 2003/0182043 A1 | 9/2003 | Christiansen et al. | |
| 2005/0121978 A1 | 6/2005 | McAvoy | |
| 2005/0193760 A1 | 9/2005 | Moran | |

OTHER PUBLICATIONS

About Hardigg, How Rotomolding Technology Works, 3 pgs, http://www.harding.com/about_hardigg/rotomolding.html; accessed Feb. 26, 2004.

TecRep Engineering, Thermoplastic-structural foam molding, 2 pgs, http://www.tecrep.com/thermoplastic_strucfoam.asp; accessed Feb. 25, 2004.

DeKalb Molded Plastics, Structual Foam, 3 pgs, http://www.dekalbplastics.com/structural.html; accessed Feb. 25, 2004.

U.S. Appl. No. 10/731,695, McAvoy.

U.S. Appl. No. 10/795,738, Moran et al.

Excelfrax 200 VIP Insulation, http://www.unifrax.com [accessed Nov. 21, 2003] (2 pgs).

Frank, Franz et al., "Systems Development for the More Electric Aircraft", Aerospace Congress & Exhibition, Sep. 10-14, 2001, Airbus, 19 pgs.

Knobe, B. et al., "Definition of Standard Interfaces for Galley Insert Equipment—GAIN", ARINC/AEEC GAIN Specification Issue 2, Nov. 19, 2003, 55 pgs.

Knobe, B. et al., "Definition of Standard Interfaces for Galley Insert Equipment—GAIN", Preliminary ARINC 628 Part 5 Strawman, Aug. 21, 2003, 49 pgs.

Phase Change Materials, http://web.mit.edu/3.082/www/team2_s02/phase_change.html; [accessed Jul. 24, 2004] (1 pg).

Sanyo Patented VIP Vacuum Insulation Panel, http://www.sanyobiomedical.com/products/vip.php [accessed Nov. 21, 2003] (2 pgs).

Aspen Aerogels, Inc., "Products—Aspen Aerogels Offers a Range of Flexible Aerogel Blanket Mat," Nov. 25, 2003, www.aspenaerogels.com/products.htm <http://www.aspenaerogels.com/products.htm>, (1 Page).

Aspen Aerogels, Inc., "Technology —Aerogels are Extraordinary Solid Insulators," Nov. 25, 2003, www.aspenaerogels.com/technology2.htm <http://www.aspenaerogels.com/technology2.htm>, (3 Pages).

* cited by examiner

AIRCRAFT GALLEY CARTS AND ASSOCIATED METHODS OF MANUFACTURE

TECHNICAL FIELD

The following disclosure relates generally to galley carts for storing and serving food on aircraft.

BACKGROUND

Flight attendants typically serve airline meals from galley carts they move up and down passenger aisles. Conventional galley carts are typically manufactured from aluminum. For example, one known galley cart is manufactured by attaching aluminum sandwich panels to an aluminum frame structure. The sandwich panels can include aluminum skins and a PVC foam or honeycomb core. This galley cart is generally handmade in a labor-intensive process. As a result, this galley cart is relatively expensive to manufacture. In addition, it is relatively heavy and thermally inefficient.

In addition to galley carts, aircraft galleys typically include waste carts for collecting food service waste and other refuse during flight. Conventional waste carts are open at the top like a typical garbage receptacle. In addition, they typically include a plurality of wheels so that they can be easily moved around the aircraft galley. One known galley waste cart manufactured by Kitterman Plastics of 4100 Riverside Street, Kansas City, Mo. 64150, is rotational molded from high-density polyethylene. Rotational molding is a cost-effective way to produce large parts from plastic. The process involves loading plastic resin into a mold that is heated as it is rotated slowly about both the vertical and horizontal axes. Simultaneously heating and rotating the mold causes the melting resin to evenly coat the internal surfaces of the mold. The mold continues to rotate during a cooling cycle so that the finished part has an even wall thickness. While suitable for refuse collection, waste carts are not suitable for food service because, inter alia, they lack means for insulating meals and stowing meals in an organized manner.

SUMMARY

The present invention is directed generally to galley carts for storing and serving food on aircraft. A galley cart configured in accordance with one aspect of the invention includes a body configured to be moved along a passenger aisle of an aircraft. The body can include a one-piece plastic shell forming a first side portion and at least one of a second side portion, a top portion, and a bottom portion of the body. The first side portion can be spaced apart from the second side portion, the top portion can extend between the first and second side portions, and the bottom portion can be spaced apart from the top portion and can also extend between the first and second side portions.

A galley cart configured in accordance with another aspect of the invention includes a body having a one-piece plastic shell with an inner skin offset from an outer skin in a double-wall configuration. The one-piece plastic shell can form at least one of a first side portion, a second side portion, a top portion, and a bottom portion of the body. In one aspect of this embodiment, the one-piece plastic shell can further include a core material positioned between the inner and outer skins of the one-piece plastic shell.

A method for manufacturing a galley cart in accordance with a further aspect of the invention includes loading plastic resin into a mold and flowing the plastic resin over an interior surface of the mold. As the plastic resin flows over the interior surface of the mold, it can form a one-piece plastic shell having an interior portion configured to support a plurality of airline meals. The method can further include removing the one-piece plastic shell from the mold and attaching a door to the one-piece plastic shell. The door can be movable to provide access to the interior portion of the one-piece plastic shell.

DETAILED DESCRIPTION

The following disclosure describes aircraft galley carts and other insulated food storage units, and associated methods of manufacture. Certain details are set forth in the following description and in FIGS. 1A-6 to provide a thorough understanding of various embodiments of the invention. Other details describing well-known structures and systems often associated with aircraft galley carts and plastics manufacturing methods are not set forth in the following disclosure to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, angles, and features without departing from the spirit or scope of the present invention. In addition, further embodiments of the invention may be practiced without several of the details described below.

In the Figures, identical reference numbers identify identical or at least generally similar elements. To facilitate the discussion of any particular element, the most significant digit or digits of any reference number refer to the Figure in which the element is first introduced. For example, element 110 is first introduced and discussed with reference to FIG. 1.

Figure 1A:
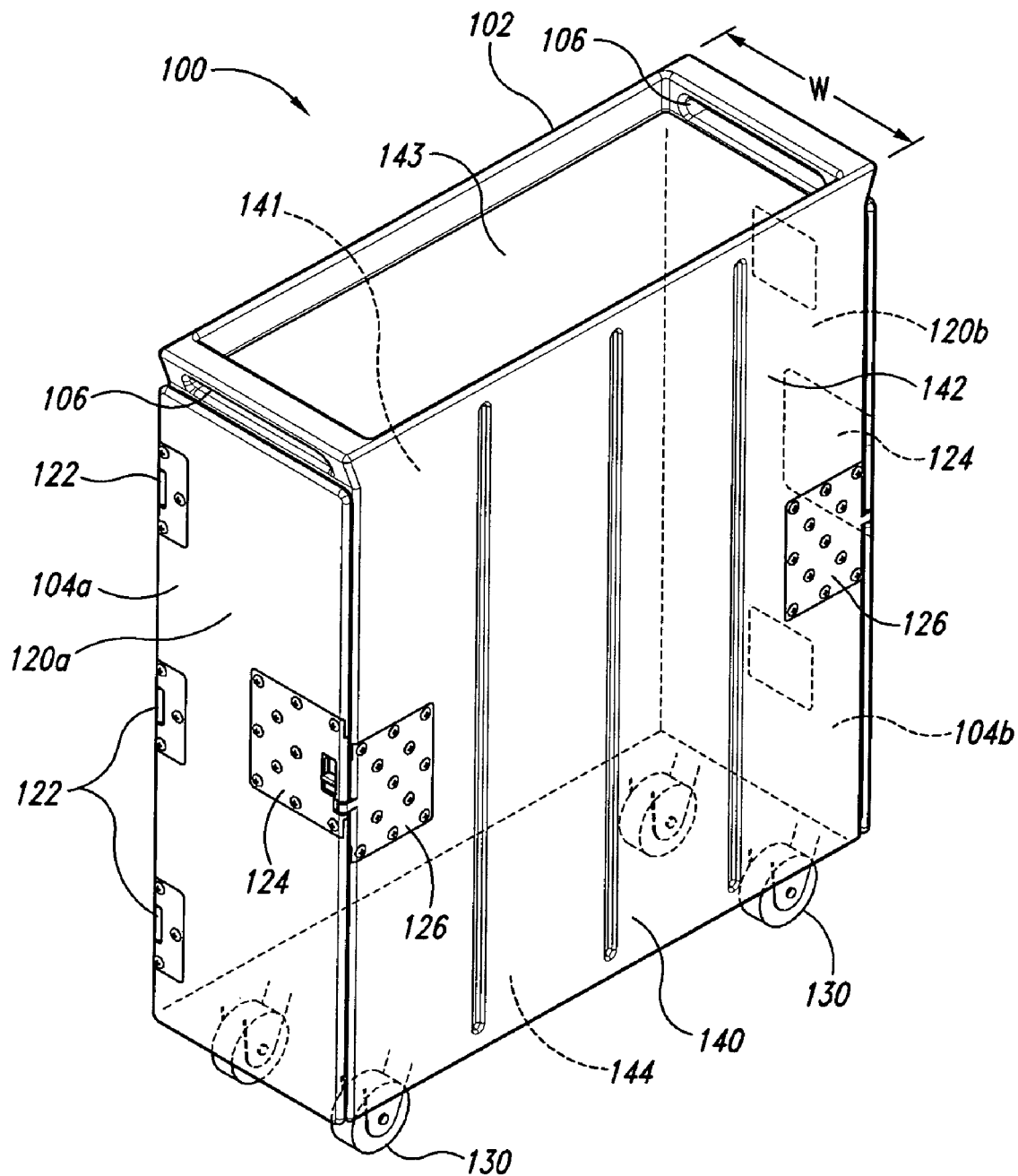
FIGS. 1A-1B are isometric views of a galley cart configured in accordance with an embodiment of the invention.
Figure 1B:
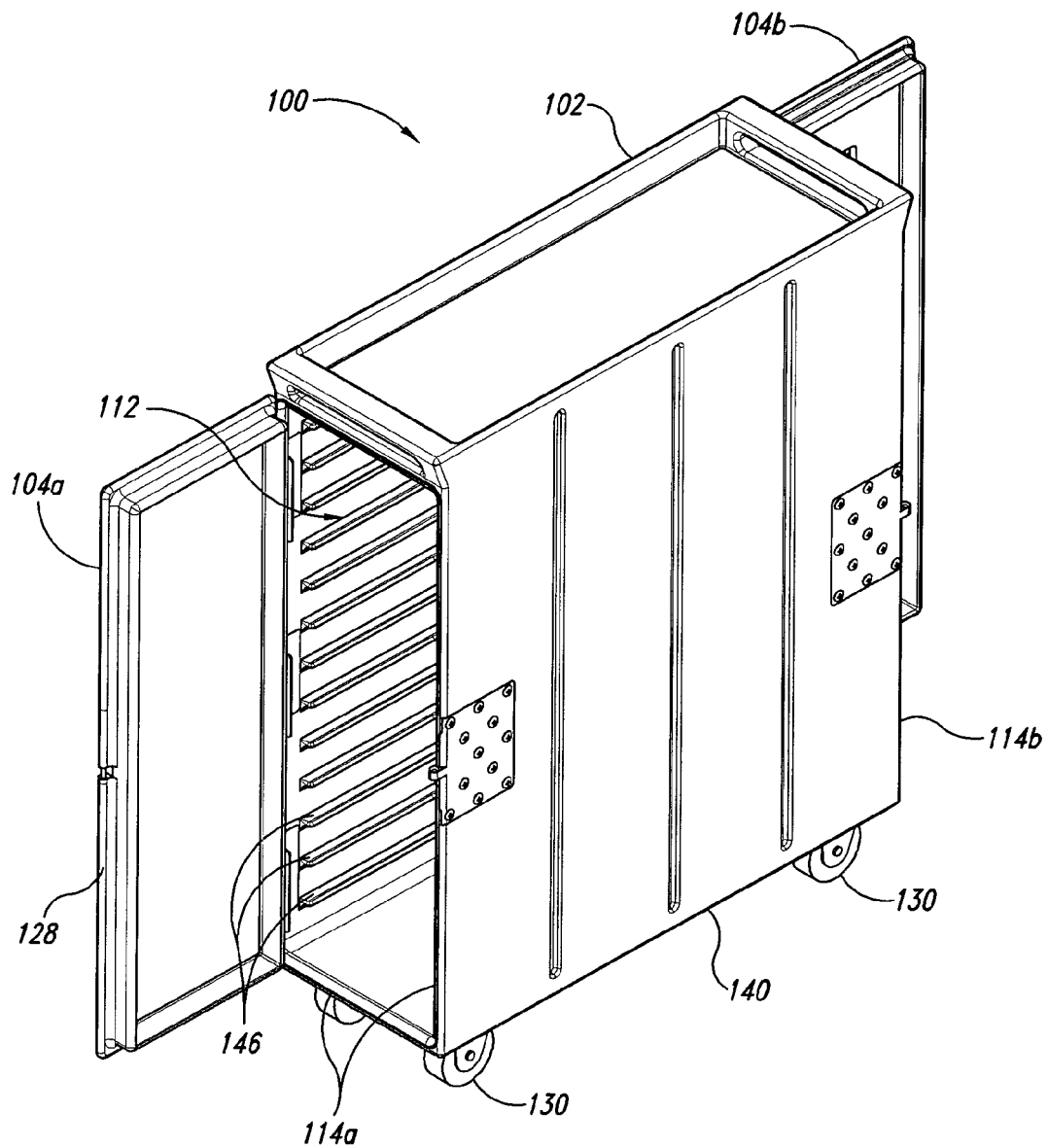

FIGS. 1A and 1B are isometric views of a galley cart 100 configured in accordance with an embodiment of the invention. Referring to FIGS. 1A and 1B together, in one aspect of this embodiment, the galley cart 100 includes a body 102 having a one-piece plastic body shell 140 ("body shell 140"). In the illustrated embodiment, the body shell 140 forms a first side portion 141, a second side portion 142, a top portion 143, and a bottom portion 144 of the body 102. In other embodiments, the body shell 140 can form more or fewer portions of the body 102. For example, in one embodiment, the first side portion 141, the second side portion 142, the top portion 143, and the bottom portion 144 can be formed from individual plastic panels that are fastened together to form the body 102. In another embodiment, the body shell 140 can form the first side portion 141, the second side portion 142, and the top portion 143 of the body 102. In this particular embodiment, a separate panel of metal, plastic, and/or other materials can form the bottom portion 144 of the body 102.

In another aspect of this embodiment, the galley cart 100 further includes a first door 104a positioned toward one end of the body 102, and a second door 104b positioned toward an opposite end of the body 102. Like the body 102, each of the doors 104 can include a one-piece plastic door shell 120 (identified individually as a first plastic door shell 120a and second door shell 120b). In addition, each of the doors 104 can further include a plurality of hinges 122 and a first latch portion 124. The hinges 122 can pivotally attach the door shells 120 to the body shell 140. The first latch portions 124 can be configured to releasably engage corresponding second latch portions 126 attached to the body shell 140 when the doors 104 are in closed positions as illustrated in FIG. 1A.

By disengaging the first latch portions 124 from the corresponding second latch portions 126, the doors 104 can be opened outwardly providing access to an interior portion 112 of the body 102 as illustrated in FIG. 1B. In a further aspect of this embodiment, the interior portion 112 of the body 102 can include a plurality of horizontal supports 146 configured to support food, including a plurality of airline meal trays (not shown). Positioning the doors 104 at respective ends of the body 102 allows flight attendants to conveniently access food stored within the body 102 from either end of the galley cart 100. In other embodiments, the second door 104b can be omitted if desired, for example, to reduce cost. As further illustrated in FIG. 1B, each of the doors 104 can additionally include a compressible seal 128 configured to seal any gaps that may exist between the doors 104 and corresponding body apertures 114a-b when the doors 104 are closed.

In yet another aspect of this embodiment, the galley cart 100 further includes a number of features configured to facilitate movement of the galley cart along a passenger aisle of an aircraft (not shown). One such feature is that the body 102 has a width W sized to fit easily between adjacent passenger seats on opposite sides of a passenger aisle. Another such feature is the provision of handles 106 formed in the top portion 143 of the body shell 140. A further such feature is a plurality of wheels 130 attached to the bottom portion 144 of the body shell 140.

Figure 2:
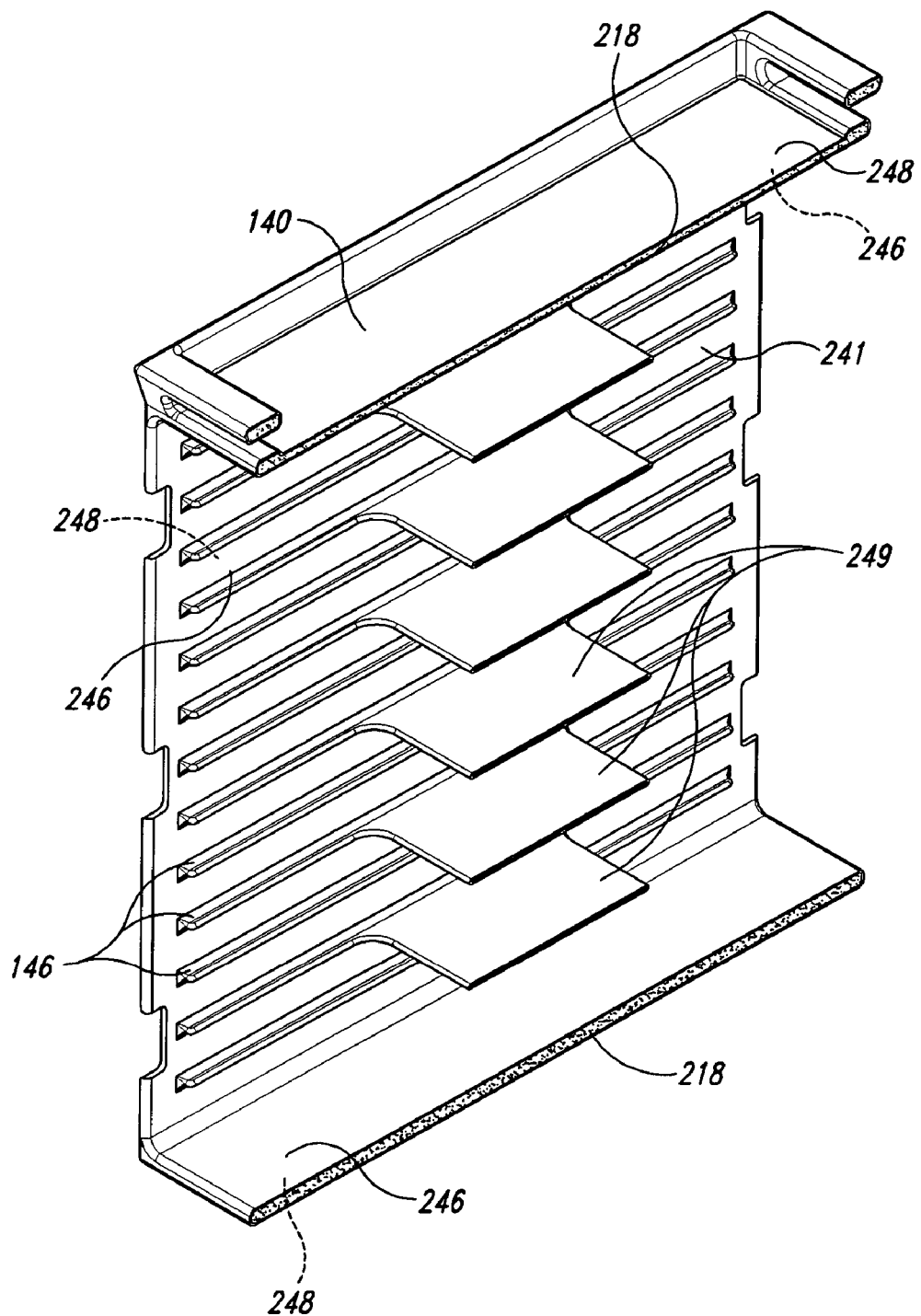
FIG. 2 is an isometric sectioned view of a galley cart body shell configured in accordance with an embodiment of the invention.

FIG. 2 is an isometric view of a section of the body shell 140 configured in accordance with an embodiment of the invention. In one aspect of this embodiment, the body shell 140 includes an inner skin 246 offset from an outer skin 248 in a double-wall configuration. In selected embodiments, a core material 218 can be positioned between the inner skin 246 and the outer skin 248. In one such embodiment, the core material 218 can include a foam material, such as foam plastic. In other embodiments, the core material 218 can include other light-weight insulating materials. In yet other embodiments, the core material 218 can be omitted if desired, for example, to reduce manufacturing costs and/or weight.

In another aspect of this embodiment, the body shell 140 further includes a plurality of horizontal shelves 249 extending inwardly from corresponding horizontal supports 146. In the illustrated embodiment, the horizontal shelves 249 extend all the way across the interior portion 112 of the body 102 (FIG. 1B) from a first interior side surface 241 to an opposing second interior side surface (not shown). The horizontal shelves 249 can provide support for food containers positioned within the interior portion 112. In addition, the horizontal shelves 249 can add rigidity to the body shell 140. In other embodiments, the horizontal shelves 249 can have shapes other than those illustrated in FIG. 2, or they can be omitted.

The body shell 140 can be manufactured using a number of different plastic molding methods in accordance with embodiments of the invention. For example, in one embodiment, the body shell 140 can be manufactured using a rotational molding method. In this embodiment, a suitable thermoplastic resin is loaded into a mold having an interior cavity in the shape of the body shell 140. The mold is heated to melt the plastic resin and rotated about two orthogonal axes to distribute the melted resin over the interior surfaces of the mold. The mold continues to rotate as it cools. After cooling, the body shell 140 is removed from the mold. One advantage of the rotational molding process is that it provides a cost-effective method for producing the double-wall portions of the body shell 140.

Another method for forming the body shell 140 in accordance with an embodiment of the invention involves structural foam molding. In this embodiment, molten plastic resin is injected into a mold after being mixed with a blowing agent or a high-pressure gas. The blowing agent produces bubbles in the molten plastic resin causing it to foam inside the mold. The plastic resin in contact with the interior mold surfaces forms opposing skins in a double-wall configuration, while the blowing agent expands the rest of the plastic resin to form a cellular foam structure between the skins. One advantage of this technique is that it provides a cost-effective method for producing embodiments of the body shell 140 that include skin/foam/skin sandwich portions. In another embodiment, the body shell 140 can be manufactured by injection molding using, for example, polyetherimide resin.

Other molding techniques can be used to produce the body shell 140 without departing from the spirit or scope of the present invention. Such methods include, but are not limited to: low-pressure injection molding, high-pressure injection molding, reaction injection molding, gas counter-pressure injection molding, co-injection or sandwich injection molding, and gas-assisted injection molding. Examples of these and other suitable molding methods can be found in "Design for Manufacturing Handbook" (2nd Ed.), Chapter 6.3, by James G. Bralla.

Although the body shell 140 of the illustrated embodiment includes portions having double-wall construction, in other embodiments, the body shell 140 can include portions of single-wall construction. However, one advantage of the double-wall construction is the added strength and insulating capability provided by the core material 218 (or dead airspace, as the case may be) between the inner skin 246 and the outer skin 248.

Figure 3:
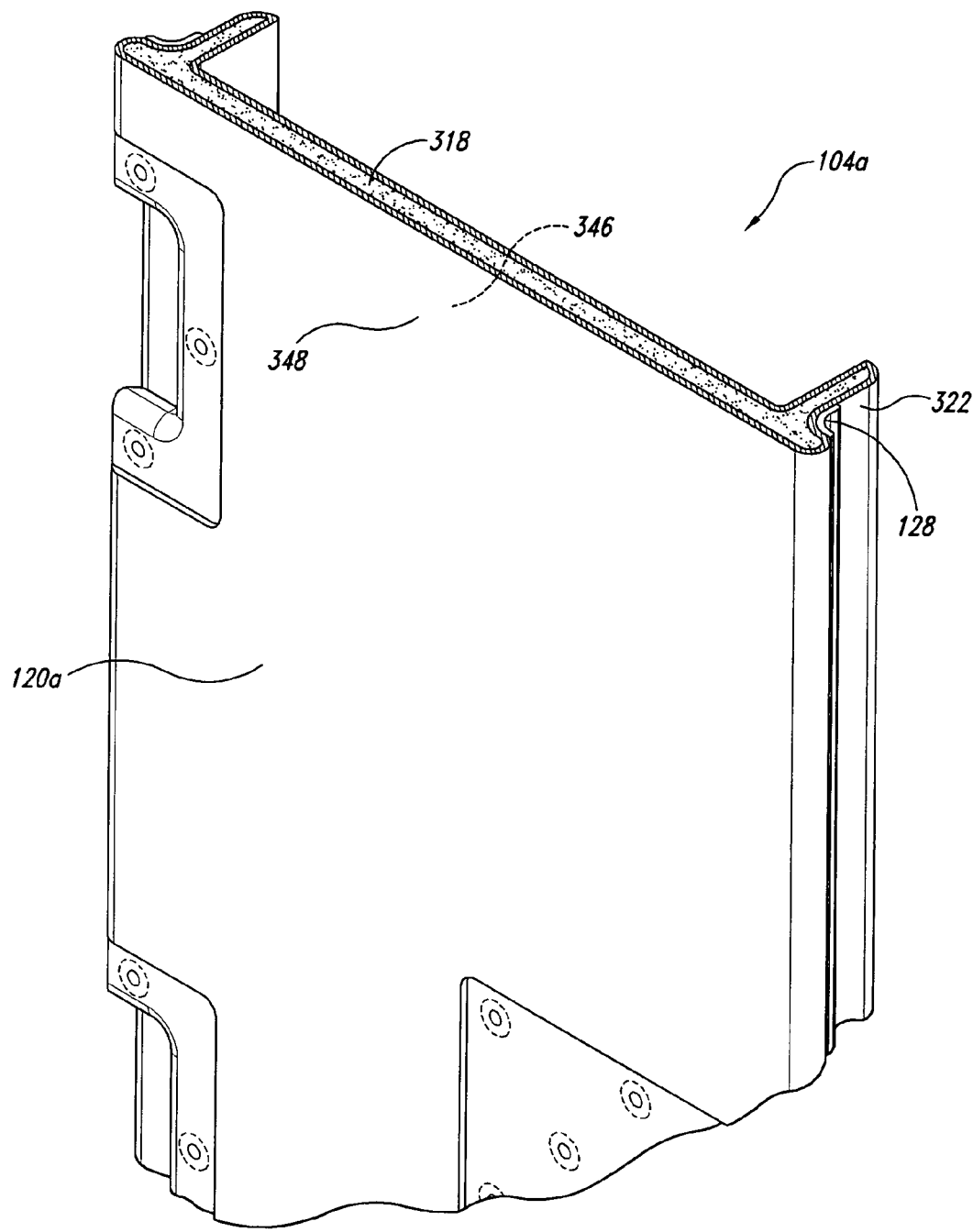
FIG. 3 is an enlarged isometric sectioned view of a galley cart door configured in accordance with an embodiment of the invention.

FIG. 3 is an enlarged isometric view of a section of the first door 104a configured in accordance with an embodiment of the invention. In one aspect of this embodiment, the door shell 120a includes an inner door skin 346 offset from an outer door skin 348 in a double-wall configuration. A core material 318, e.g., plastic foam material, can be positioned between the inner door skin 346 and the outer door skin 348 to enhance the structural or insulative characteristics of the door 104a. In other embodiments, the core material 318 can be omitted, for example, to reduce cost and/or weight. In another aspect of this embodiment, the door shell 120a can be manufactured using any one of the plastic molding methods described above for the body shell 140.

In a further aspect of this embodiment, the door shell 120a includes a lip portion 322 protruding inwardly at least proximate to the perimeter of the door shell 120a. The seal 128 can be attached along the outboard base of the lip portion 322 so that the seal 128 seats partially on the lip portion 322 and partially on the adjacent inner door skin 346. Positioning the seal 128 in this manner can effect a better seal between the door shells 120 and the corresponding body apertures 114 (FIG. 1B) than would otherwise be achieved by a conventional flat seal positioned only on the inner door skin 346.

One advantage of forming the body 102 and the doors 104 (FIGS. 1A and 1B) out of one-piece plastic shells is that assembly time can be greatly reduced because of the reduced part count. As a result, the galley cart 100 can be manufactured relatively inexpensively when compared to conventional galley carts manufactured from metal parts. A further advantage of manufacturing the body 102 and the doors 104 in this manner is that it results in a relatively light-weight galley cart. Yet another advantage is associated with the double-wall construction of the body shell 140 and the door shells 120. Double-wall panels having air and/or a cellular core material between the inner and outer skins have relatively high thermal insulating characteristics.

Figure 4:
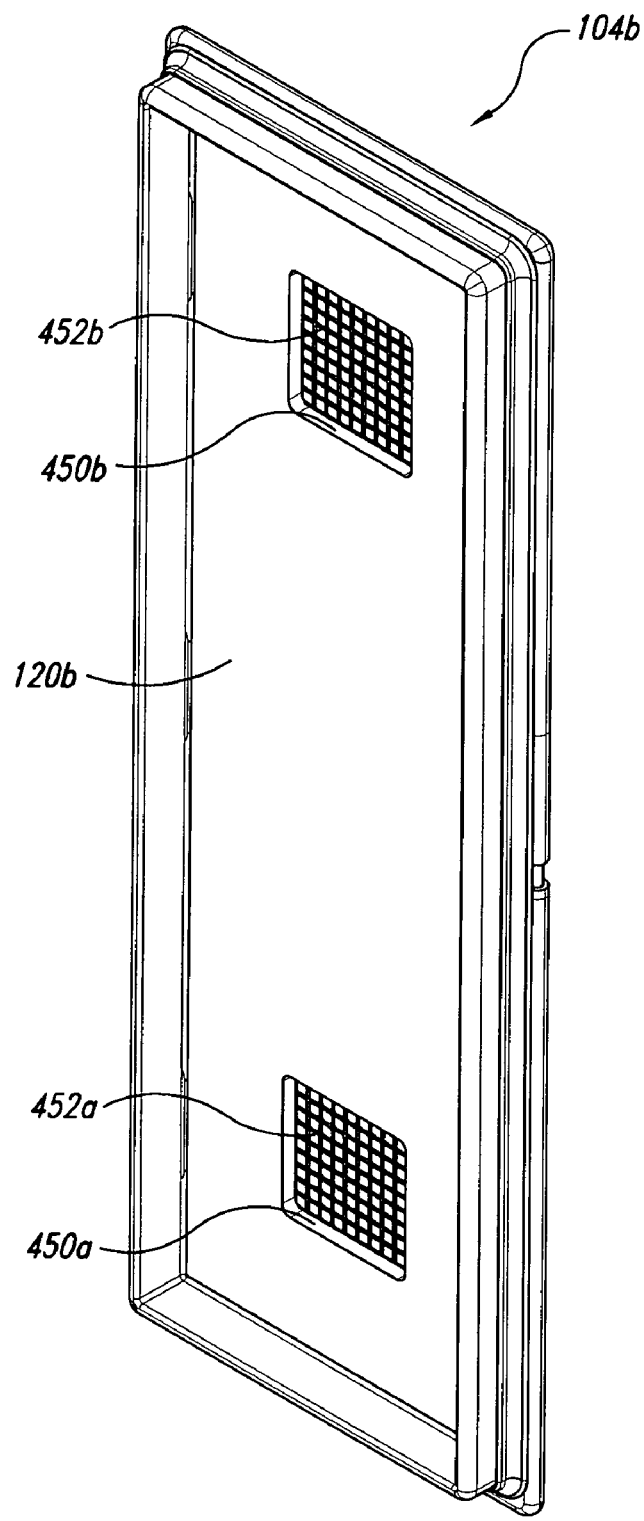
FIG. 4 is an enlarged isometric view of another galley cart door configured in accordance with a further embodiment of the invention.

FIG. 4 is an enlarged isometric view of the second door 104b configured in accordance with an embodiment of the invention. The second door 104b can be at least generally similar in structure and function to the first door 104a described above with reference to FIG. 3. In one aspect of this embodiment, however, the second door 104b further includes a plurality of air apertures 450 (identified individually as a first air aperture 450a and a second air aperture 450b) formed in the second door shell 120b. The first air aperture 450a can be configured to receive cool air from an exterior source (not shown) for cooling the interior portion 112 of the galley cart 100 (FIG. 1B). The second air aperture 450b can be configured to let air exit the interior portion 112 as the cooler air is flowing in through the first air aperture 450a. In addition, the second door 104b can further include a first vent 452a and a second vent 452b positioned over the corresponding air apertures 450 to facilitate the circulation of cool air through the galley cart 100. In other embodiments, one or more of the air apertures 450 can be omitted. For example, in one embodiment, the second air aperture 450b can be omitted and overpressure air can flow out of the interior portion 112 via minor gaps between the doors 104 and the body 102. In a further embodiment, the second air aperture 450b can be configured to let air enter the interior portion 112, and the first air aperture 450a can be configured to let air exit. In other embodiments, both of the air apertures 450 can be omitted if cool air circulation is not necessary or desired for the galley cart 100.

Figure 5:
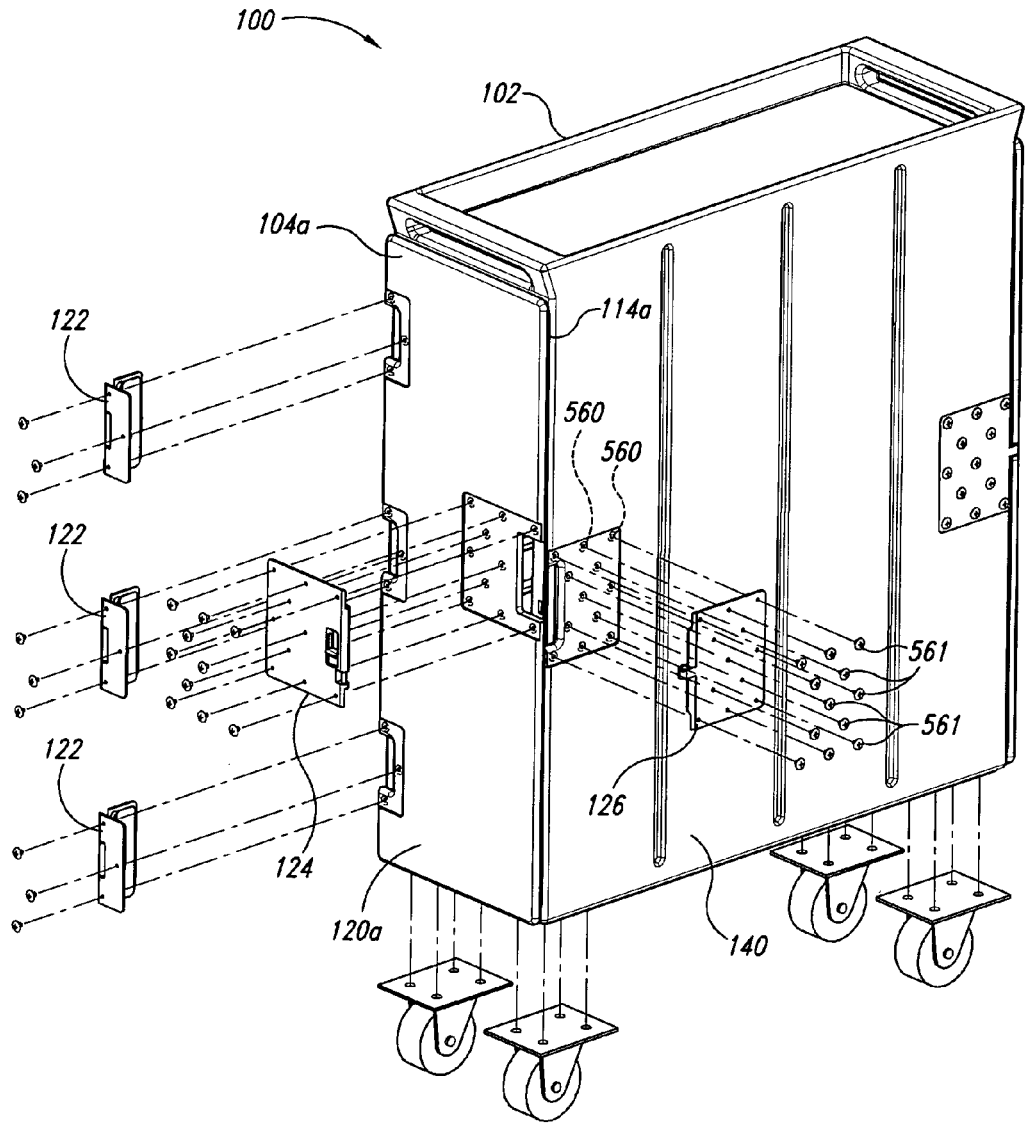
FIG. 5 is an exploded isometric view of the galley cart of FIGS. 1A and 1B illustrating some hardware attachment features configured in accordance with an embodiment of the invention.

FIG. 5 is an exploded isometric view of the galley cart 100 illustrating hardware attachment features configured in accordance with an embodiment of the invention. In one aspect of this embodiment, the body 102 can include a plurality of inserts 560 molded into the body shell 140 proximate to the first door aperture 114a. The inserts 560 can be individual threaded inserts configured to receive corresponding threaded fasteners 561 that attach the second latch portion 126 to the body shell 140. In another arrangement, the inserts 560 can be replaced by one or more plates (not shown) having a plurality of threaded holes configured to receive the corresponding fasteners 561. In another aspect of this embodiment, the inserts 560 can be made from a metal material, such as steel, or titanium, or aluminum. In other embodiments, the inserts 560 can be made from nonmetallic materials, such as resin-based materials. In further embodiments, the inserts 560 can be omitted, and the fasteners 561 can engage other features, such as threaded holes formed directly in the body shell 140, to attach the second latch portion 126 to the body shell 140.

In a further aspect of this embodiment, other parts of the galley cart 100 can be attached to the body 102 and/or the doors 104 using inserts similar to the inserts 560 described above. For example, in one embodiment, the wheels 130 can be attached to the body shell 140 in a similar manner. Similarly, in another embodiment, the hinges 122 can be attached to the door shells 120 and the body shell 140 in a similar manner.

Figure 6:
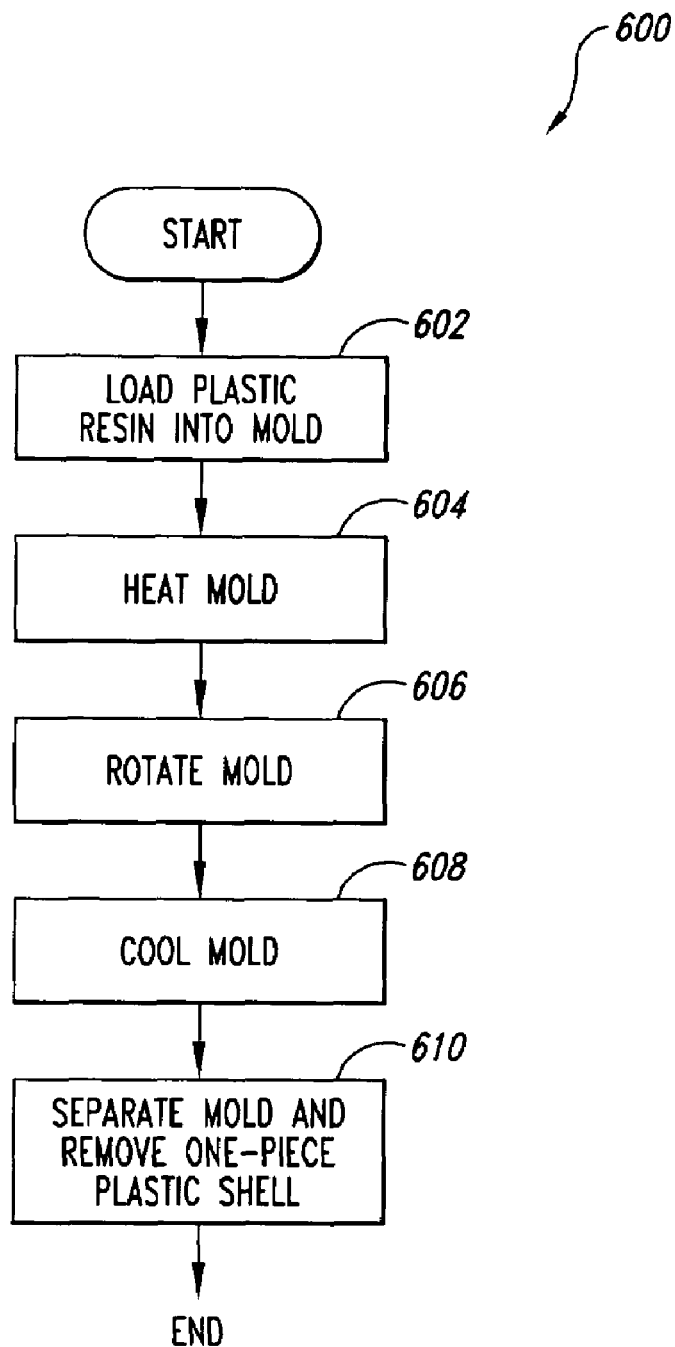
FIG. 6 is a flow diagram illustrating a method for manufacturing a one-piece plastic shell for an aircraft galley cart in accordance with an embodiment of the invention.

FIG. 6 is a flow diagram illustrating a method 600 for manufacturing a one-piece plastic shell for an aircraft galley cart in accordance with an embodiment of the invention. In block 602, plastic resin is loaded into a mold of the one-piece plastic shell. In one embodiment, loading plastic resin into the mold can include injecting molten plastic resin into the mold. In another embodiment, dry plastic resin can be loaded into the mold and, as shown In block 604, the mold can heated to melt the plastic resin. In block 606, the mold can be rotated to distribute the molten plastic resin over the interior surface of the mold. In one embodiment, the combination of heating and rotating the mold causes the plastic resin to form an inner and outer skin in a double-wall configuration. In block 608, the mold can be cooled to harden the plastic resin. In one embodiment, the mold can be cooled as it continues to rotate. In block 610, the method 600 can further include separating the mold after it is sufficiently cooled and removing the one-piece plastic shell from the mold. The method 600 ends after block 610.

After manufacturing the one-piece plastic shell in accordance with the method 600, additional assembly steps can be taken to complete manufacture of the galley cart. For example, one or more doors can be added to the one-piece plastic shell to provide access to the enclosed interior portion. Additionally, one or more rollers can be added to the bottom portion of the shell to provide mobility.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A galley cart for use on an aircraft, the galley cart comprising:
  a body configured to be moved along a passenger aisle of the aircraft, the body including a one-piece plastic shell, wherein the one-piece plastic shell includes an inner skin, an outer skin offset from the inner skin in a double-wall configuration, and a foam core positioned between the inner and outer skins, wherein the inner skin, the outer skin and the foam core are formed from the same material, and wherein the one-piece plastic shell forms:
  a first side portion of the body;
  a second side portion of the body;
  a top portion of the body;
  a bottom portion of the body, wherein the first side portion is spaced apart from the second side portion, wherein the top portion extends between the first and second side portions, and wherein the bottom portion is spaced apart from the top portion and extends between the first and second side portions; and
  at least one horizontal shelf extending from the first side portion to the second side portion between the top and bottom portions;
  at least one threaded insert molded into the one-piece plastic shell;
  a door;
  a hinge attached to the door; and at least one threaded fastener engaging the threaded insert and attaching the hinge to the one-piece plastic shell to pivotally attach the door to the body.

2. The galley cart of claim 1 wherein the one-piece plastic shell includes an injection molded portion.

3. The galley cart of claim 1 wherein the one-piece plastic shell includes a rotational molded portion.

4. The galley cart of claim 1 wherein at least a portion of the door includes an inner door skin offset from an outer door skin in a double-wall configuration.

5. The galley cart of claim 1 wherein at least a portion of the door includes an inner door skin offset from an outer door skin in a double-wall configuration, and wherein the door further includes core material positioned between the inner and outer door skins.

6. The galley cart of claim 1 wherein at least a portion of the door includes an inner door skin offset from an outer door skin in a double-wall configuration, wherein the door further includes a foam core positioned between the inner and outer door skins, and wherein the inner and outer door skins and the foam core are formed from the same material.

7. The galley cart of claim 1, further comprising a door with a cool air aperture positioned at least proximate to the body, wherein the cool air aperture is configured to let cool air from an exterior source flow into the body.

8. The galley cart of claim 1, further comprising a door hingeably attached to the body, wherein the door includes a cool air aperture configured to let cool air from an exterior source flow into the body.

9. The galley cart of claim 1 wherein the horizontal shelf includes a foam core positioned between a first shelf skin and a second shelf skin.

10. The galley cart of claim 1 wherein the horizontal shelf includes a foam core positioned between a first shelf skin and a second shelf skin, and wherein the foam core and the first and second shelf skins are formed from the same material.

11. A galley cart for use on an aircraft, the galley cart comprising:
  a body configured to be moved along a passenger aisle of the aircraft, the body including a one-piece plastic shell having an inner skin offset from an outer skin in a double-wall configuration, the one-piece plastic shell forming:
    a first side portion of the body;
    a second side portion of the body;
    a top portion of the body;
    a bottom portion of the body, wherein the first side portion is spaced apart from the second side portion, wherein the top portion extends between the first and second side portions, and wherein the bottom portion is spaced apart from the top portion and extends between the first and second side portions; and
  a plurality of horizontal shelves extending from the first side portion to the second side portion between the top and bottom portions;
  a plurality of threaded inserts molded into the one-piece plastic shell;
  a door;
  a plurality of hinges attached to the door;
  a first plurality of threaded fasteners engaging a first portion of the threaded inserts and attaching the plurality of hinges to the one-piece plastic shell to pivotally attach the door to the body;
  a plurality of rollers; and
  a second plurality of threaded fasteners engaging a second portion of the threaded inserts and attaching the plurality of rollers to a lower portion of the one-piece plastic shell for moving the body along a passenger aisle of an aircraft.

12. The galley cart of claim 11 wherein the one-piece plastic shell further includes core material positioned between the inner and outer skins of the one-piece plastic shell.

13. The galley cart of claim 11 wherein the one-piece plastic shell further includes a foam core positioned between the inner and outer skins of the one-piece plastic shell.

14. The galley cart of claim 11 wherein the one-piece plastic shell further includes a foam core positioned between the inner and outer skins of the one-piece plastic shell, and wherein the inner and outer skins and the foam core are formed from the same material.

15. The galley cart of claim 11 wherein the one-piece plastic shell is a first one-piece plastic shell, and wherein the door comprises a second one-piece plastic shell.

16. The galley cart of claim 11 wherein the one-piece plastic shell is a first one-piece plastic shell, wherein the door comprises a second one-piece plastic shell, and wherein the second one-piece plastic shell includes an inner door skin offset from an outer door skin in a double-wall configuration.

17. The galley cart of claim 11 wherein the one-piece plastic shell is a first one-piece plastic shell, wherein the galley cart further comprises a second one-piece plastic shell at least partially forming a door hingeably attached to the body, and wherein the second one-piece plastic shell includes a cool air aperture configured to let cool air from an exterior source flow into the body.

18. The galley cart of claim 17 wherein the cool air aperture is a first aperture, and wherein the second one-piece plastic shell further includes a second aperture configured to let air exit the body.

* * * * *